June 24, 1930.　　G. E. WAGNER ET AL　　1,765,893
POWER OPERATED TRIP FOR EXCAVATOR SCOOPS
Filed March 18, 1927　　2 Sheets-Sheet 1
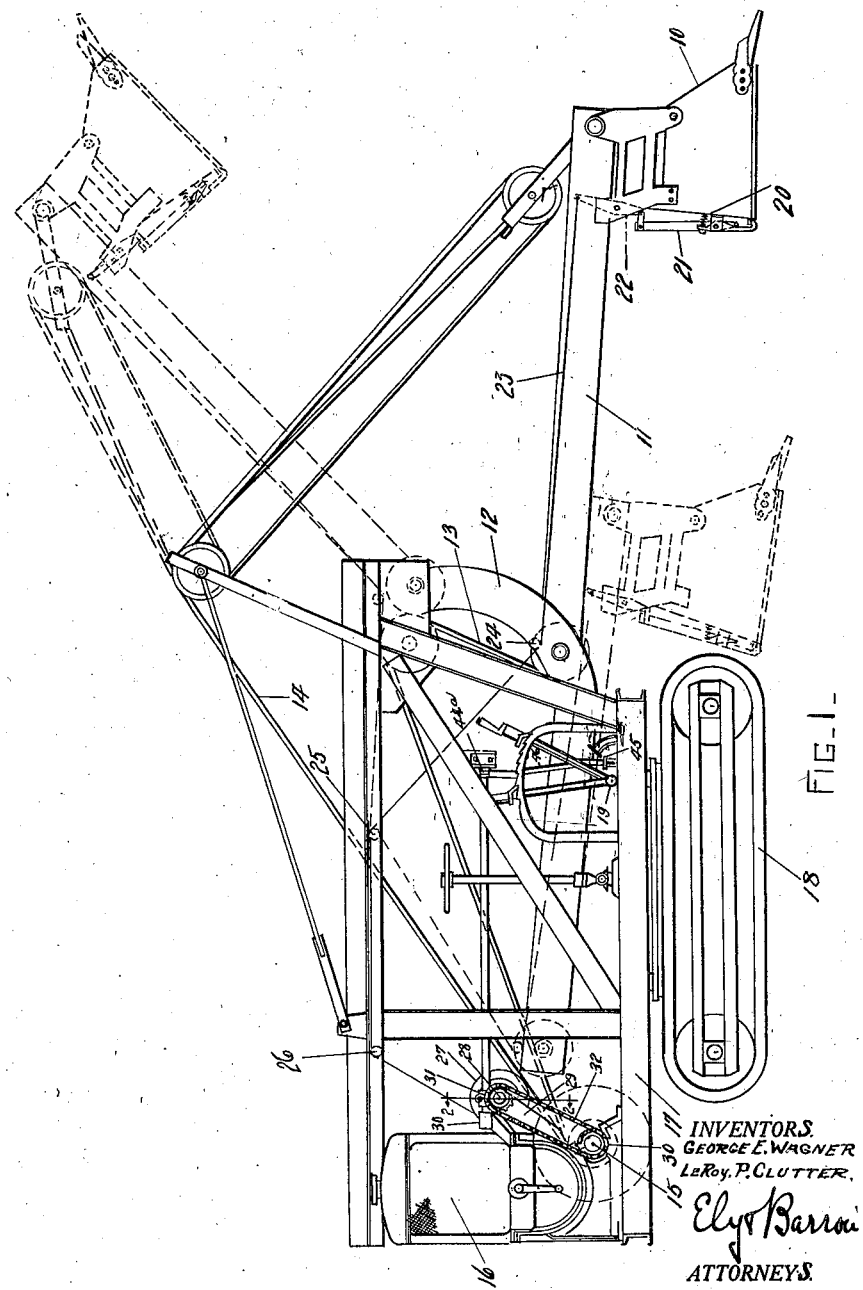

June 24, 1930.  G. E. WAGNER ET AL  1,765,893
POWER OPERATED TRIP FOR EXCAVATOR SCOOPS
Filed March 18, 1927  2 Sheets-Sheet 2
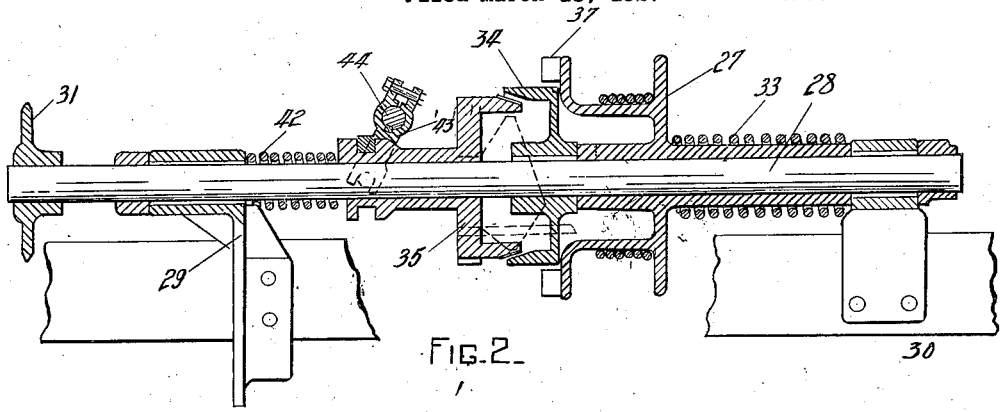
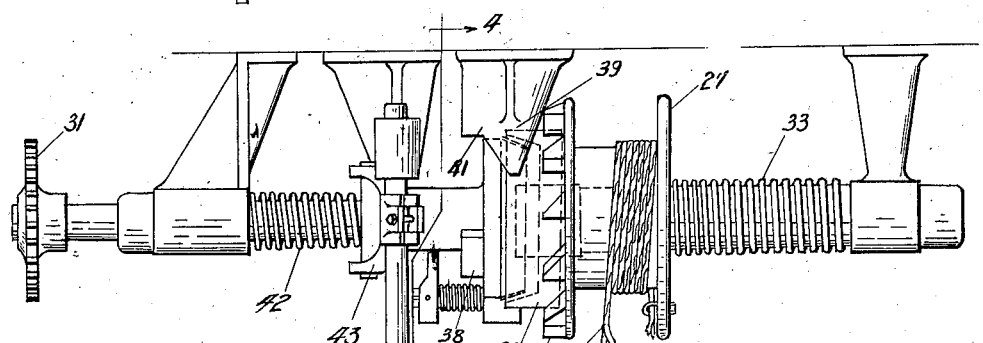
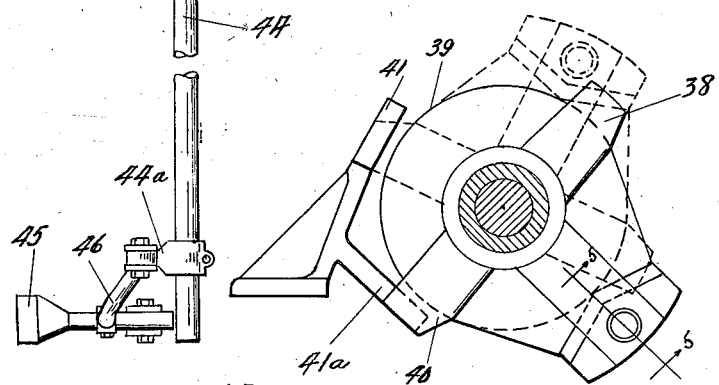
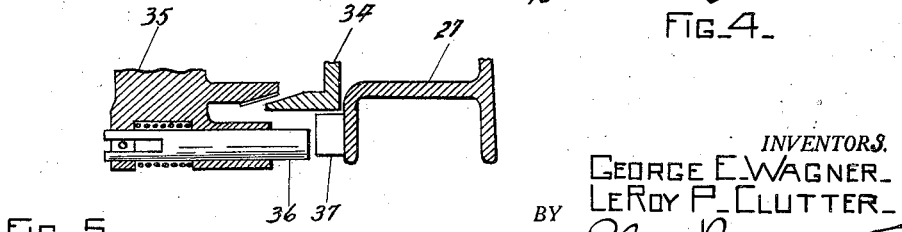
INVENTORS.
GEORGE E. WAGNER
LEROY P. CLUTTER
BY Ely & Barrow
ATTORNEYS.

Patented June 24, 1930

1,765,893

UNITED STATES PATENT OFFICE

GEORGE E. WAGNER, OF AKRON, OHIO, AND LE ROY P. CLUTTER, OF DEER LICK, PENNSYLVANIA, ASSIGNORS, BY MESNE ASSIGNMENTS, TO CLUTTER-WAGNER, INC., A CORPORATION OF OHIO

POWER-OPERATED TRIP FOR EXCAVATOR SCOOPS

Application filed March 18, 1927. Serial No. 176,434.

This invention relates to power operated trips for excavator scoops.

Heretofore, many different types of mechanical, electrical and power-operated trips have been devised. These, however, have not been entirely successful, the mechanical trips being not a great deal more efficient than the ordinary hand rope trip, the electrical trips being frequently out of commission on account of transmission troubles or too severe drainage on the batteries, etc., and the power-operated trips, i. e. those driven from the prime mover of the excavator, being not sufficiently positive to function properly at all times and under all conditions of service.

The present invention has for its general object the provision of an improved power-operated trip controlled from the station of the single excavator operative and positively operable from the drive shaft of the excavator so as to always trip the scoop at the desired instant.

Particularly the invention has for an object the provision of power-operated means for producing a predetermined positive travel of the trip rope within definitely defined limits.

Another particular object is the provision of a combined friction and positive clutch for operating the trip line actuating drum which may have attached thereto the usual retrieving spring or weights to maintain the trip line taut.

Another object is to provide in combination with the above clutch, automatic means for positively disengaging the clutch after it has rotated the drum through the required angle to obtain the required travel of the trip line.

A further object of the invention is to provide in combination with the clutch, means for retrieving the same to its original position after a tripping operation in readiness for a succeeding tripping operation.

The foregoing and other objects are obtained by the construction of a power trip as shown in the accompanying drawings and described below. It is to be understood that the invention is not limited to the specific form thereof shown and described.

Of the accompanying drawings,

Figure 1 is a side elevation of an excavator having the improved trip mounted therein;

Figure 2 is a longitudinal section through the power trip device on line 2—2 of Figure 1;

Figure 3 is a plan of the trip device, partly broken away;

Figure 4 is a section on line 4—4 of Figure 3; and

Figure 5 is a section on line 5—5 of Figure 4.

Referring to the drawings, the numeral 10 designates an excavator scoop which may be operated by suitable excavator mechanism such as the handle 11 geared to a track 12 and operable by a crowding line 13 and a hoisting line 14 coiled on drums mounted on shaft 15 which is driven by a prime mover 16 all mounted on a deck 17 on a tractor or other vehicle 18, the excavator control levers being arranged at an operator's station at 19. The trip of the present invention is adapted for use in any type of excavator, only one known type being herein illustrated.

The scoop 10 herein shown opens at its rear end 20, a suitable latch 21 for holding it shut being arranged to be tripped by a lever 22 to which is connected a trip line 23 extended over suitable guide pulleys 24, 25 and 26 mounted on the frame of the excavator to a drum 27.

Drum 27 is journaled on a shaft 28, which latter is journaled in suitable brackets 29 and 30 and is arranged to be driven from the shaft 15 by a sprocket 31 secured on shaft 28 and over which is trained a drive chain 32 driven by a sprocket 32$^a$ on shaft 15. For maintaining the line 23 taut, suitable yielding means, such as a coil spring 33, secured at one end to bracket 30 and at the other end to drum 27, is arranged to be effective on drum 27 so as to tend to wind line 23 onto the drum.

Actuation of drum 27 is provided for by arranging on shaft 28 a friction clutch including a member 34 secured on the shaft, and a member 35 shiftable thereon, and mounting on member 35 an element such as a pin 36 for positively engaging teeth 37, 37 on drum 27, pin 36 being spring mounted to be retractile so that should it at any time move into engagement with the top of a tooth 37, it will ride over the same and into engagement with a succeeding tooth. This arrangement provides a friction clutch for assuming the initial load occasioned by throwing the trip in operation and relieves this load from the positive pin and tooth engagement, the heavy initial load being absorbed by the clutch.

To the end that the line 23 will be pulled a predetermined required distance to effect a scoop tripping operation, clutch member 35 carries a cam 38 arranged to engage a fixed cam plate 39 arranged in the path thereof and designed to shift member 35 out of engagement. Also to prevent operation of the trip mechanism in the wrong direction by inadvertent engagement of the clutch when drum 27 is rotating due to pulling action on line 23 as the scoop handle is being moved, a cam 40 is arranged on clutch member 35 and a fixed cam plate 41 is arranged in the path thereof to disengage the clutch.

In order that the pin 36 will be properly reset after each tripping operation, suitable yielding means may be provided for returning the clutch member 35 to an initial angular position. In the particular embodiment shown, the clutch member on that side on which the pin is mounted is heavier and, in addition, a retrieving spring 42 may be connected to the clutch member 35.

The clutch member 35 is arranged to be controlled from the operative's station by means of a shifting yoke 43 in a rock shaft 44 extending to the station 19 and having an operating arm 44ᵃ thereon arranged to be operated by a foot pedal 45 through a link 46.

In use, when the scoop 10 has been actuated to a dumping elevation, such as indicated in dotted lines in Figure 1, the pedal 45 is depressed to engage clutch member 35 which engages pin 36 with a tooth 37 on drum 27 and positively rotates the drum 27 counter-clockwise, the amount of this rotation being determined by the knock-out cam 39 and varying on succeeding operations not more than the distance between two teeth 37. Upon disengagement of the clutch member 35, its unbalanced weight and spring 42 retrieve it, returning it to its initial position as shown in full lines in Figure 4. The retrieving action on clutch member 35 throws cam 40 against cam plate 41 which may have a bumper at 41ᵃ thereon to absorb the shock.

It is to be noted that by the provision of a positive clutching connection between the shiftable knock-out clutch member 35 and the drum 27, the latter may normally rotate freely to pay out or take in the tripping cable during actuation of the shovel, but nevertheless it is actuated through a predetermined angle for tripping, this angle being only slightly variable depending upon the spacing of the teeth 37.

Modifications of the invention may be resorted to without departing from the spirit thereof or the scope of the appended claims.

What is claimed is:

1. A power-operated trip for excavators comprising a trip line extending to the scoop of the excavator, a drum upon which the trip line is reeled, yielding means effective on the drum to maintain the line taut, a shaft adapted to be driven by the prime mover of the excavator, said drum being freely journaled on said shaft, a friction clutch member secured to said shaft, a shiftable friction clutch member journaled on the shaft and arranged to cooperate with the first clutch member, means operable by said shiftable clutch member for positively rotating the drum, said means including a retractile pin on the shiftable clutch member and circumferentially spaced teeth on the drum arranged to be engaged by said pin, means effective on the shiftable clutch member for normally urging said member to an initial angular position, means for disengaging said shiftable clutch member after a predetermined angular travel thereof, said means including a cam on said shiftable clutch member and a fixed cam plate arranged in the path of said cam, and means for controlling the shiftable clutch member from the operative's station on the excavator.

2. A power-operated trip for excavators comprising a trip line extending to the scoop of the excavator, a drum upon which the trip line is reeled, yielding means effective on the drum to maintain the line taut, a shaft adapted to be driven by the prime mover of the excavator, said drum being freely journaled on said shaft, a friction clutch member being secured to said shaft, a shiftable friction clutch member journaled on the shaft and arranged to cooperate with the first clutch member, means operable by said shiftable clutch member for positively rotating the drum, said means including a retractile pin on the shiftable clutch member and circumferentially spaced teeth on the drum arranged to be engaged by said pin, means effective on the shiftable clutch member for normally urging said member to an initial angular position, means for disengaging the shiftable clutch member after a predetermined angular travel thereof, and means for controlling the shiftable clutch member from the operative's station on the excavator.

3. A power-operated trip for excavators comprising a trip line extending to the scoop of the excavator, a drum upon which the trip line is reeled, yielding means effective on the drum to maintain the line taut, a shaft adapted to be driven by the prime mover of the excavator, said drum being freely journaled on said shaft, a friction clutch member secured to said shaft, a shiftable friction clutch member journaled on the shaft and arranged to cooperate with the first clutch member, means operable by said shiftable clutch member for positively rotating the drum, means effective on the shiftable clutch member for normally urging said member to an initial angular position, means for disengaging said shiftable clutch member after a predetermined angular travel thereof, said means including a cam on said shiftable clutch member and a fixed cam plate arranged in the path of said cam, and means for controlling the shiftable clutch member from the operative's station on the excavator.

4. A power-operated trip for excavators comprising a trip line extending to the scoop of the excavator, a drum upon which the trip line is reeled, yielding means effective on the drum to maintain the line taut, a shaft adapted to be driven by the prime mover of the excavator, said drum being freely journaled on said shaft, a friction clutch member secured to said shaft, a shiftable friction clutch member journaled on the shaft and arranged to cooperate with the first clutch member, means operable by said shiftable clutch member for positively rotating the drum, means effective on the shiftable clutch member for normally urging said member to an initial angular position, means for disengaging said shiftable clutch member after a predetermined angular travel thereof, and means for controlling the shiftable clutch member from the operative's station on the excavator.

5. A power-operated trip for excavators comprising a trip line extending to the scoop of the excavator, a drum upon which the trip line is reeled, yielding means effective on the drum to maintain the line taut, a shaft adapted to be driven by the prime mover of the excavator, said drum being freely journaled on said shaft, a friction clutch member secured to said shaft, a shiftable friction clutch member journaled on the shaft and arranged to cooperate with the first clutch member, means operable by said shiftable clutch member for positively rotating the drum, said means including a retractile pin on the shiftable clutch member and circumferentially spaced teeth on the drum arranged to be engaged by said pin, and means for controlling the shiftable clutch member from the operative's station on the excavator.

6. A power-operated trip for excavators comprising a trip line extending to the scoop of the excavator, a drum upon which the trip line is reeled, yielding means effective on the drum to maintain the line taut, a shaft adapted to be driven by the prime mover of the excavator, said drum being freely journaled on said shaft, a clutch member secured to said shaft, a shiftable clutch member journaled on the shaft and arranged to cooperate with the first clutch member, means effective on the shiftable clutch member for normally urging said member to an initial angular position, means for disengaging said shiftable clutch member after a predetermined angular travel thereof, said means including a cam on said shiftable clutch member and a fixed cam plate arranged in the path of said cam, and means for controlling the shiftable clutch member from the operative's station on the excavator.

7. A power-operated trip for excavators comprising a trip line extending to the scoop of the excavator, a drum upon which the trip line is reeled, yielding means effective on the drum to maintain the line taut, a shaft adapted to be driven by the prime mover of the excavator, said drum being freely journaled on said shaft, a friction clutch member secured to said shaft, a shiftable friction clutch member journaled on the shaft and arranged to cooperate with the first clutch member, means operable by said shiftable clutch member for positively rotating the drum, and means for controlling the shiftable clutch member from the operative's station on the excavator.

8. A power-operated trip for excavators comprising a trip line extending to the scoop of the excavator, a drum upon which the trip line is reeled, yielding means effective on the drum to maintain the line taut, a shaft adapted to be driven by the prime mover of the excavator, said drum being freely journaled on said shaft, a clutch member secured to said shaft, a shiftable clutch member journaled on the shaft and arranged to cooperate with the first clutch member, means effective on the shiftable clutch member for normally urging said member to an initial angular position, means for disengaging said shiftable clutch member after a predetermined angular travel thereof, and means for controlling the shiftable clutch member from the operative's station on the excavator.

9. A power-operated trip for excavators, said trip comprising a trip line extending to the excavator scoop, a drum on which said line is reeled, and means for operating the drum comprising a driven shaft, a combined friction and positive clutch for connecting said shaft to said drum whereby the load applied by the shaft by shifting the clutch into engagement is assumed in the main by the friction means, the load being relieved from the positively engaging elements, and means for positively disengaging the clutch from the shaft and drum after a predetermined angular travel of the drum.

10. A power-operated trip for excavators, said trip comprising a trip line extending to the excavator scoop, a drum on which said line is reeled, and means for operating the drum comprising a driven shaft and a combined friction and positive clutch for connecting said shaft to said drum, whereby the inertia load occurring when the clutch is shifted into engagement is assumed in the main by the friction means, this load being relieved from the positively engaging elements.

11. The combination in a power drive for excavator trips, of a trip line, means for pulling the trip line, a rotating member for actuating the pulling means and means for connecting the pulling means to the member for a tripping operation comprising a combined friction and positive knockout clutch for providing a frictional connection thereof to the rotating member and a positive connection to the pulling means.

12. The combination in a power drive for excavator trips, of a trip line, means for pulling the trip line, a rotating member for actuating the pulling means, and means for connecting the pulling means to the member for a tripping operation comprising a combined friction and positive clutch for providing a frictional connection thereof to the shaft and a positive connection thereof to the pulling means.

13. The combination in a power drive for excavator trips, of a trip line, means for pulling the trip line, a rotating member for actuating the pulling means, means for connecting the pulling means to the member for a tripping operation comprising a knockout clutch adapted to be self-disengaging after a predetermined travel thereof, said clutch being normally disconnected from said rotating member and from said pulling means, and means for actuating said clutch to connect said rotating member and said pulling means, whereby said pulling means is actuated a predetermined distance by said rotating member through said clutch.

14. The combination in an excavator of a trip device including a trip line, a drum on which the trip line reels, and means for actuating the drum including means effective on the drum for causing the line positively to travel a predetermined distance within predetermined limits, said means including a clutch, interengaging means for positively connecting the clutch to said drum and friction means for connecting the clutch to the source of power, and means effective on the drum for yieldingly retrieving the line.

15. The combination in an excavator of a trip device including a trip line, a drum on which the trip line reels, and means for actuating the drum including positive means effective on the drum for causing the line positively to travel a predetermined distance within predetermined limits, a power driven member and friction means for connecting the positive means to said member for rotation through a predetermined angle, and means effective on the drum for yieldingly retrieving the line.

16. In a power-operated trip control device for excavators, a driven member, a trip pulling member, and means for connecting the trip pulling member to the driven member, said means including relatively movable members comprising a knockout friction clutch having means on one member for positively engaging the pulling member, and means for normally urging the said member of the clutch to an initial angular position from which it may operate the pulling member.

17. The combination in an excavator of a power-operated scoop trip line actuating mechanism including a driven shaft and a clutch on the shaft normally operable into engagement at one angular position and out of engagement at another angular position to effect a predetermined travel of the line for tripping the scoop.

18. The combination in an excavator of a power-operated scoop trip line actuating mechanism including a driven shaft and a clutch on the shaft normally operable into engagement at one angular position and out engagement at another angular position to effect a predetermined travel of the line for tripping the scoop, said clutch having both frictionally and positively engaging means thereon for actuting said mechanism, the frictional means for connecting the clutch to the driven shaft and the positive means for connecting the clutch to the line.

19. The combination in an excavator of a power-operated scoop trip line actuating mechanism including a drive shaft, a trip line pulling device adapted to be operated thereby when rotating in one direction, and a clutch on the shaft for operating said device, said clutch having means thereon for automatically disengaging the clutch members after actuation of the trip line a predetermined distance and also means thereon for automatically disengaging the clutch members if they are engaged when said drum is operating in the other direction.

20. In a power operated trip, a trip line and operating drum therefor normally adapted to pay out or take in the trip line, and power means adapted to be connected with the drum, a knock-out clutch for connecting the power means to the drum, said clutch including engageable friction members and means on one of said members and cooperating means on the drum for rotating the drum by said clutch, said drum normally being free of the clutch.

21. In a device of the character described, and in combination with a power shovel having a power driven shaft and a dipper trip rope, a drum for said rope, means for selectively connecting said drum with said power shaft to wind said rope on said drum, and means for automatically disconnecting said drum from said shaft after limited rotation thereof.

GEORGE E. WAGNER.
LE ROY P. CLUTTER.